United States Patent [19]

Burguette et al.

[11] Patent Number: 4,569,962
[45] Date of Patent: Feb. 11, 1986

[54] PERFLUOROPOLYETHER COMPOSITIONS WHICH ARE SOLUBLE IN NON-FLUORINATED SOLVENTS

[75] Inventors: Mario D. Burguette, Woodbury, Minn.; George D. Foss, River Falls, Wis.

[73] Assignee: Minnesota Mining and Manufacturing Company, St. Paul, Minn.

[21] Appl. No.: 533,305

[22] Filed: Sep. 19, 1983

[51] Int. Cl.⁴ ............................................. C08F 14/18
[52] U.S. Cl. ........................................ 522/74; 522/75; 522/76; 522/78; 522/79; 523/174; 522/80; 524/113; 524/137; 524/147; 524/148; 524/149; 524/190; 524/243; 524/247; 524/544; 525/276; 526/246; 526/247; 526/248; 522/90
[58] Field of Search ..................... 204/159.15, 159.22; 523/174; 524/113, 137, 147, 148, 149, 190, 243, 247, 544; 525/276; 526/246, 247, 248

[56] References Cited

U.S. PATENT DOCUMENTS

| | | |
|---|---|---|
| 3,310,606 | 3/1967 | Fritz ..................................... 526/247 |
| 3,321,532 | 5/1967 | Lorenz ................................ 526/247 |
| 3,351,619 | 11/1967 | Warnell .............................. 526/247 |
| 3,397,191 | 8/1968 | Beckerbauer ....................... 526/247 |
| 3,450,684 | 6/1969 | Darby ................................. 526/247 |
| 3,467,638 | 9/1969 | Pattison .............................. 526/247 |
| 3,553,179 | 1/1971 | Bartlett .............................. 526/247 |

Primary Examiner—Harry Wong, Jr.
Attorney, Agent, or Firm—D. M. Sell; J. A. Smith; D. B. Little

[57] ABSTRACT

Polymeric compositions are provided in which perfluoropolyethers have been solubilized in non-fluorinated solvents by combining them with a solubilizing agent such as azotic conjugated compounds, and phosphorylated compounds. Typical of the perfluoropolyethers is

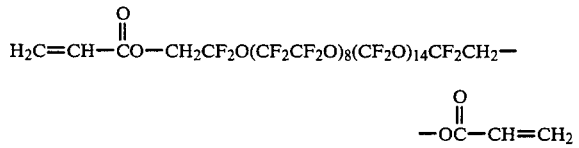

Typical of the solubilizing agents is phosphorylated methacryloyloxyhydroxypropylisophthalate. The perfluoropolyether and the solubilizing agent are mixed to form a paste which is soluble in organic solvents such as methylethylketone. These compositions find utility as protective lubricant coatings for thin film magnetic recording media. They have the advantage that only one coating step is required in order to apply both the phosphorylated compound and the lubricating polyether. Recording media lubricated with these compositions have demonstrated excellent wear characteristics.

16 Claims, No Drawings

4,569,962

PERFLUOROPOLYETHER COMPOSITIONS WHICH ARE SOLUBLE IN NON-FLUORINATED SOLVENTS

TECHNICAL FIELD

This invention relates to blends of perfluoropolyethers with other compounds, and particularly to blends that have broader solubility than the perfluoropolyether itself has. The inventive blends are especially useful as lubricants or top coats for magnetic recording media.

BACKGROUND

Many efforts are underway to replace the magnetizable coatings conventionally used in magnetic recording media, which comprise magnetizable particles dispersed in organic binder, with metallic thin-film magnetic layers. The latter layers are considered to be capable of a higher density of information storage, especially when they have an easy axis of magnetization perpendicular to the surface of the layer (see U.S. Pat. No. 4,210,946), which makes possible perpendicular recording.

A major problem with metallic thin-film magnetic recording media is their susceptibility to wear. Record/playback transducer heads contacting the metallic thin film will have a tendency to erode or otherwise damage the film. Even slight erosion will result in considerable loss of data when high bit density recording is employed. Applications which would involve erosion and severe wear of metallic thin film magnetic media are on the increase, with video tape and electronic cameras being two examples.

One approach to increase the life of metallic thin film media is to apply some sort of protective covering over the layer, such as a fluorinated polyether (see U.S. Pat. Nos. 3,778,308, 4,267,238; and 4,268,556). This covering, known as the lubricant or top coat, functions to lubricate, add corrosion protection, and give wear resistance to the magnetic medium.

The lubricating or top coat layer should be firmly anchored to the magnetic recording layer so that it will not be removed or cause clogging of the recording or playback heads, but in most cases in the prior art, it is believed that fluorinated lubricants have been applied as coatings from halogenated solutions or emulsions with no means, other than physical absorption or adsorption, of bonding the lubricant to the magnetic recording medium. Commonly assigned U.S. Pat. No. 4,404,247 discloses a protective covering for magnetic recording media comprising: (a) an inner layer of film forming aromatic or heterocyclic polymerizable monomer and vinyl aromatic polymer, and (b) an outer layer of a compound containing perfluoropolyether segments (often referred to herein simply as "perfluoropolyether"). The above materials can be separately applied in solution to magnetic recording media in two coating steps and be subsequently in-situ polymerized. The contiguous monomers of the two layers are said to apparently copolymerize, bonding the perfluoropolyether segments to the magnetizable coating through the inner layer. The perfluoropolyether lubricant is said to have a significantly greater adherence to the metallic thin-film magnetizable layer on the recording medium than it would have if it had been directly applied, because of the inner layer material. Since the monomers of the inner layer are soluble in organic solvents and the perfluoropolyether is soluble in fluorinated solvents, two separate coating steps were used.

It is the object of this invention to avoid the need for two separate coating steps by providing a single coatable mixture of a perfluoropolyether and a solubilizing agent, which mixture is soluble in a common non-fluorinated solvent. It is a further object to use as the solubilizing agent a material that functions as a primer material, i.e., increases the adhesion or anchoring of the perfluoropolyether to a metallic substrate, and particularly to a thin-film metal substrate of a magnetic recording medium.

DISCLOSURE OF INVENTION

A means has been found to make perfluoropolyethers compatible with organic solvents in which they are normally insoluble. New compositions are provided which are believed to be associated mixtures which might be thought of as inclusion compounds, solutions or amphiphylic substances.

The new compositions are single phase as defined below, and comprise:
 a. a perfluoropolyether comprising a plurality of perfluoroalkylene oxide repeating units; and
 b. a solubilizing agent which is
  (i) not spontaneously chemically reactive with the perfluoropolyether of part a, and
  (ii) soluble to at least one percent by weight both in a common nonfluorinated organic solvent, and in a chlorofluorocarbon solvent (such as 1,1,2-trichloro-2,2,1-trifluoroethane, 1,1-dichloro-1,2,2,2-tetrafluoroethane, dichloro-difluoromethane, or chloro-trifluoromethane.

As indicated, the new compositions can further include solvent, e.g., to control viscosity, and to control the thickness of a coating that can be formed from the new compositions.

Preferably, the solubilizing agent is selected from (1) oil soluble azotic conjugated compounds such as the quinoneimino, quinonediimino, triarylmethane, and diazo dyes and colorants, and (2) phosphorylated compounds, i.e., the reaction product of a phosphoric acid or a phosphorous containing compound and an organic compound.

While functioning as a solubilizing agent, at least the phosphorylated compounds also act as a primer material and when a composition of the invention including such compositions is applied to a metallic substrate, well anchored coatings are achieved.

As used in this description, the term "single phase" means a mixture, the components of which are not readily physically or mechanically separated from each other and do not separate from one another upon prolonged storage, e.g., one month.

The term common non-fluorinated organic solvents as used herein means non-fluorinated organic solvents of the following types: aromatics (such as xylene, benzene, and toluene); ketones (such as methylethylketone, methylisobutylketone and cyclohexanone); ethers (such as tetrahydrofuran); esters; amides; alcohols (such as ethanol); chlorinated aliphatic and cycloaliphatic solvents; and blends of the foregoing.

The term "spontaneously chemically reactive", as used herein, means characterized by a tendency to undergo a chemical reaction with perfluoropolyethers under the conditions at which the solubilizing agent is mixed with the perfluoropolyether. Those conditions are normally atmospheric pressure and room temperature although temperature can be elevated somewhat. The chemical reaction spoken of may be any of the wide variety of reactions (such as combination reactions, decomposition, and oxidation/reduction).

Both the perfluoropolyether of part a. and the solubilizing agent may be polymerizable, and they may also be co-polymerizable under conditions other than those at which they are first mixed. That is they may have functionalities such as ethylenic double bonds; epoxide rings; ester, carboxylic acid, hydroxy or amine groups capable of condensation polymerization, or isocyanate radicals capable of reacting to form urethane linkages.

The perfluoropolyethers may be classed as poly(perfluoroalkylene oxide)polymers or oligomers which may either include or not include one or more functional groups. They preferably have an average of at least about 1.5 ethylenically unsaturated polymerizable functional sites per molecule.

The phosphorylated compounds of part b., which may be polymerizable or unpolymerizable monomers, oligomers or polymers preferably have a branched structure and contain an aromatic or hetero atom moiety. Polymerizability is preferably provided through the inclusion in the compound of a plurality of ethylenically unsaturated polymerizable moieties.

The azotic conjugated compounds are typically, but not necessarily, dyes. The group is conveniently referred to herein as dyes.

Another aspect of this invention involves the use of the dyes of part b. to help stabilize the homogeneous mixtures of perfluoropolyether and phosphorylated compound, especially when the latter are at high concentrations in nonfluorinated solvents. Compositions containing both a phosphorylated compound and a dye (as a stabilizer) are, therefore, included within the scope of this invention.

The two components of parts a. and b. are preferably not simply added together to a non-fluorinated solvent to form a homogeneous mixture. Instead, the perfluoropolyether is preferably added to the phosphorylated compound or dye (which may contain a slight amount of non-fluorinated solvent to reduce viscosity) and the two are mixed to form a paste. In this paste phase the two components become associated, and the paste phase will form stable single phase admixtures in common nonfluorinated organic solvents.

To obtain good adhesion to a metallic substrate, the inventive composition preferably comprises less than about one-third perfluoropolyether, the remainder being the solubilizing agent of part b. Generally, at least one weight-percent of the mixtures is perfluoropolyether, and preferably it comprises between 5 and 20 weight-percent of the mixture. When the mixture is made with the dyes of part b. instead of the phosphorylated compounds, soluble mixtures have been prepared which comprise up to 96 weight percent perfluoropolyether.

The dyes, which are soluble in both fluorocarbon and non-fluorinated solvents, may be mixed with the perfluoropolyether in a fluorocarbon solvent which is then stripped off to form a residue which is soluble in non-fluorinated solvents.

Articles such as thin metal film recording media can be coated with the inventive compositions by contacting the surface of such articles with a dilute solution (e.g. one percent or less) of the inventive composition; drying to remove most of the solvent; and preferably copolymerizing the coating (e.g., curing by means of exposure to electromagnetic radiation, such as ultraviolet radiation). This provides a low surface energy, adherent covering which protects metallic thin film magnetic media from abrasion and corrosion. These compositions may also be used as protective coatings for particulate/binder type magnetic media. Magnetic recording media having this new protective coating are considered to be part of this invention.

When any coating is added to a recording medium surface, there is a resultant loss in output signal depending on the thickness of the coating. This is called head spacing loss. With the one-phase system of this invention, it is possible to achieve a monomolecular layer of the top coat on the recording medium. This helps to minimize head space loss.

The single step coating process which is enabled by this invention is more efficient and economical than processes involving two coating steps, and the need for fluorocarbon solvent and associated solvent recovery systems is eliminated as well.

DETAILED DESCRIPTION

The perfluoropolyether monomers of part a. preferably have the formula

wherein Q comprises a polymerizable group attached to $R_f$, which represents a chain of one or more randomly distributed perfluoroalkylene oxide units which may be branched or straight chain structures, exemplified by the group consisting of $-C_aF_{2a}O-$ and

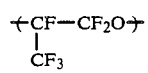

in which a is independently an integer of 1 to 4, k is the number of such units having a value from 1 to 300 such that the segment $R_f$ preferably has a number average molecular weight of 500 to 20,000, and Z is $-OC_aF_{2a+1}$ or Q.

The use of the term "independently" with reference to subscript a means that, while within each perfluoroalkylene oxide unit the subscripts a have the same number, the a may vary independently from one perfluoroalkylene oxide unit to another. Thus, formula A encompasses polyethers in which $-CF_2O-$ segments are bonded together as randomly repeating units in the molecule.

If Z is not Q, it preferably is $-OCF_3$, $-OCF_2CF_3$, or $-OCF(CF_3)$ $CF_3$. Typically the perfluoroalkylene oxide units will be $-CF_2O-$, $-C_2F_4O-$, and/or $-C_3F_6O-$.

Preferred perfluoropolyether monomers are the ethylenically unsaturated monomers disclosed in U.S. Pat. No. 3,810,874 (Mitsch et al.) and U.S. Pat. No. 4,321,404 (Williams et al.) wherein Q of the above formula A is selected from

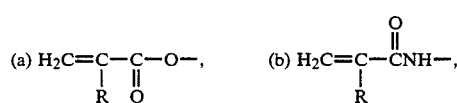

-continued (c) 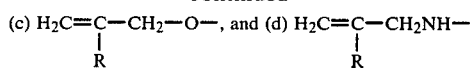, and (d) H₂C=C—CH₂NH—
                                    |
                                    R where R is hydrogen or methyl. The preferred ethylenically-unsaturated perfluoropolyether monomers have the formula

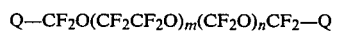  (B)

wherein Q is defined above and m and n designate the number of randomly distributed perfluoroethyleneoxy and perfluoromethyleneoxy backbone repeating units, respectively n and m having independently values, for example, from 1 to 200, and the ratio m/n is 0.2/1 to 5/1, preferably about 0.8/1. A preferred molecular weight range is 2000 to 4000 for the thin metal film top coat.

Examples of polymerizable perfluoropolyether monomers of Formula A useful in this invention are those of the following formulas where here again, as elsewhere, the perfluoroalkylene oxide units are randomly distributed, the given number (a subscript) of which are average values.

The phosphorylated compounds of part b. are preferably synthesized from compounds which have reactive sites for the phosphoric acid radical. Such sites are exemplified by: epoxide, hydroxyl,

and thiol —SH groups.

The phosphorylating reagent may be a phosphoric acid derivative having the formula

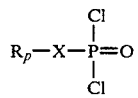

in which $R_p$ is an alkyl, cycloalkyl or aromatic group; and X is —O—, —S—, or

in which R' is hydrogen or $R_p$.

Some of the suitable classes of phosphorylated compounds are phosphorylated α,β-unsaturated carboxylic acid esters of polyhydric phenols such as bisphenol A; phosphorylated acrylates or methacrylates of glycidyl esters of dicarboxylic acids such as isophthalic acid; and phosphorylated urethane acrylates.

The following group of phosphorylated dimethacrylates represent resins which have been found particularly useful as the solubilizing agent of part b:
phosphorylated bis[4—methacryloyloxyhydroxypropylcarbamato—cyclohexyl]methane;
phosphorylated methacryloyloxyhydroxypropylisophthalate;
phosphorylated dimethacrylate of hydroxypropoxylated bisphenol A; and
phosphorylated copolymers of glycidylmethacrylate and either an alkyl methacrylate (or acrylate) or styrene methacrylate (or acrylate).

In addition to the acrylates and methacrylates exemplified above, other unsaturated acid groups having up to five or six carbon atoms may be used.

The dyes which have been found to be most useful as a solubilizing agent in the composition of this invention are iminoquinone dyes of the following structures:

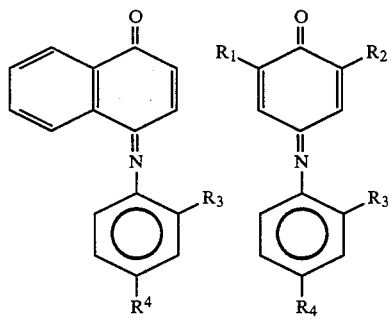

wherein $R_1$ and $R_2$ may be —H, —Cl or —CH$_3$; $R_3$ may be —H or methyl; and $R_4$ may be —H, dialkylamino or morpholino groups; or an diiminoquinone dye of the following structure:

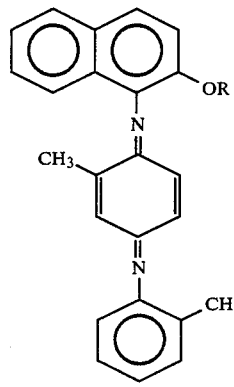

wherein R can be —H, methyl or ethyl; or azo dyes such as DuPont Oil Red dye, color index 26105, having the general molecular structure:

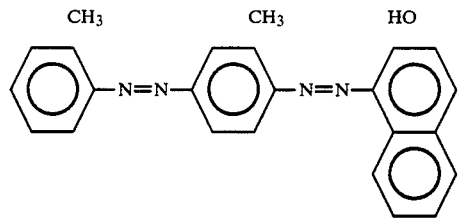

A suitable magnetic recording layer is a thin metal film comprised of cobalt chrome alloy for perpendicular recording or cobalt nickel alloy for horizontal recording. This alloy coating would typically have a thickness of 1000 to 2000 angstroms.

When solvent is added to a composition of the invention, the solvent preferably amounts to at least 75 weight-percent and more preferably at least 90 or 95 weight-percent of the resulting solution.

After the inventive associated compositions have been coated onto a thin film magnetic recording medium, it is believed that the perfluoropolyether portion of the coating becomes oriented such that the fluorine-containing moieties are at the air interface, rather than the metal interface, of the coating.

The invention will be further clarified by a consideration of the following examples which are intended to be purely exemplary. The first three examples present organic syntheses of phosphorylated resins of part b.

EXAMPLE I

Phosphorylated Bis[4—methacryloyloxyhydroxypropylcarbamato—cyclohexyl]methane

Step 1. Reactants
  6.6 parts (by weight) Dicyclohexylmethane-4,4'-diisocyanate
  4.0 parts (by weight) Glycidol
  0.1 parts (by weight) Dibutyltindilaurate
  20.0 parts (by weight) Toluene The reactants were placed into a 3-neck reaction flask fitted with a thermometer, mechanical stirrer and condenser. The reaction mixture was subsequently heated to about 100° C. and maintained at said temperature for about 2 hours. The volatiles were subsequently removed at a temperature of about 60° C. and a pressure of about 5 mm Hg. The resultant product (ie., dicyclohexylmethane-4,4'-diglycidyl carbamate) was used as such to prepare the methacryloyl derivative.

Further suitable diisocyanates include diphenylmethyldiisocyanate, 4,4'-diphenyletherdiisocyanate, isopropyledene bis(4-phenylisocyanate), bisphenylenediisocyanate and isocyanate terminated urethane prepolymers and the like.

Step 2. Reactants
10.0 parts (by weight) Product from Step 1.
5.5 parts (by weight) Methacrylic acid
0.03 parts (by weight) 2,4,6-trimethoxyphenol
10.0 parts (by weight) Benzene
20.0 parts (by weight) Toluene The product from Step 1 was dissolved in the benzene and toluene solvent blend of Step 2 with the remaining ingredients being subsequently added. The reaction mixture temperature was slowly increased to about 100° C. and maintained at said temperature for about 2 hours, while said mixture was continuously agitated. Following this reaction period, the excess methacrylic acid, solvent and other volatiles were stripped off at a temperature of about 60° C. and a pressure of about 10 mm of Hg. A viscous syrup resulted which was utilized as such to prepare the phosphorylated product.

Step 3.

N,N-diethylamidodichlorophosphoric acid (1 part by weight) was dissolved in 10 parts of dry benzene and thence added to a solution comprising 10 parts of the methacryloyl derivative product of Step 2 along with 1.15 parts of triethylamine in 60 parts of dry benzene. The reaction mixture was heated to a temperature of about 50° C. and maintained at said temperature, while being continuously agitated, for about 12 hours. This was followed by removal of triethylamine hydrochloride by-product via filtration. Benzene and other volatiles were further removed from the filtrate, under reduced pressure. The remaining residue was washed with benzene which was subsequently removed at a temperature of about 60°–65° C. and a pressure of about 20 mm of Hg. The resultant viscous product, phosphorylated bis[4—methacryloyloxyhydroxypropylcarbamato)cyclohexyl]methane, comprised one component of the coating solution as further detailed in Example IV.

A suitable degree of phosphorylation will include the range of about 0 to about 30% by weight with about 0.2 equivalents per equivalent of polyol being a preferred amount.

The N,N-diethylamidodichlorophosphoric acid intermediate of Step 3 can be prepared via the reaction of 6.0 parts by weight of N,N-diethylamine and 8.3 parts of triethylamine in 60 parts of dry benzene, with 12.5 parts of POCl$_3$ dissolved in 65 parts of dry benzene added slowly with agitation maintaining a temperature of 10° C. The mixture is stirred for an additional two hours at room temperature. The solid triethylamine hydrochloride by-product is subsequently removed via filtration. Solvent is stripped from the filtrate under reduced pressure to obtain the intermediate. Diphenyl, dimethyl and dicycloalkyl amidodichlorophosphoric acids are other useful phosphorylating reagents which may be similarly synthesized.

EXAMPLE II

Preparation of Resin B

Phosphorylated Methacryloyloxyhydroxypropylisophtalate

Step 1.

4.4 parts by weight of glycidol, 6.0 parts of triethylamine and 30 parts of dry benzene were added to a 150 ml 3 neck flask, adapted to hold a dropping funnel, mechanical stirrer and thermometer, said flask being subsequently cooled to about 0° C. 6.1 parts of isophthaloyl chloride in 15.0 parts of dry benzene were introduced in a dropwise manner into said flask over a period of about 70 minutes, while maintaining a temperature below about 25° C. The reaction mixture was agitated at about room temperature for about 1 hour and then filtered. The filtrate was stripped of solvent under reduced pressure to yield a soft mass of solute.

Acrylation of said solute was accomplished as follows:

Step 2. Reactants
8.0 parts (by weight) Solute (product) from Step 1
6.0 parts (by weight) Methacrylic acid
0.1 parts (by weight) 2,4,6-trimethoxyphenol
20.0 parts (by weight) Dry Benzene
30.0 parts (by weight) Toluene The above reactants were placed in a reaction flask as in Step 1 and slowly heated to a temperature of about 100° C. and maintained at said temperature for about 2 hours. The excess methacrylic acid and other volatiles were subsequently removed at a temperature of about 60° C. and at a reduced pressure of about 20 mm of Hg. The viscous mass of solute (product) obtained was utilized as such in the phosphorylation step which follows.

Step 3. Reactants
10.0 parts (by weight) Solute (product) from Step 2
15.0 parts (by weight) Benzene
1.5 parts (by weight) N,N-diethylamidodichlorophosphoric acid
40.0 parts (by weight) Dry Benzene
1.6 parts (by weight) Triethylamine This reaction was carried out as described in Step 3 of Example I.

EXAMPLE III

Preparation of Resin C

Phosphorylated Dimethacrylate of Hydroxypropoxylated Bisphenol A

The dimethacrylate or hydroxypropoxylated bisphenol A is the reaction product of bisphenol A and glycidyl methacrylate, and its synthesis is taught in U.S. Pat. No. 3,066,112. It may be phosporylated using the reagents and procedures previously described.

A preferred material is prepared as follows.

Reagents
10.0 parts (by weight) Dimethacrylate of hydroxypropoxylated bisphenol A
1.6 parts (by weight) N,N-diethylamidodichlorophosphoric acid in 15.0 parts of dry benzene
1.7 parts (by weight) Triethylamine in 40 parts of dry benzene
40.0 parts (by weight) Dry Benzene The reaction mixture of the above ingredients is agitated for about 12 hours while at about 40° C., to yield the phosphorylated product.

EXAMPLES IV-VI

The next several examples represent coating compositions using phosphorylated compound or resin and tests of those compositions. In the research which led to this invention, the procedure followed was to thoroughly mix about 7 parts by weight of the phosphorylated resin with about 1 part of perfluoropolyether using a spatula to form a homogeneous paste. If the resin was excessively viscous, a small quantity of solvent such as cyclohexanone was added to lower the viscosity and make blending easier. A 0.15 weight-/volume percent dilute solution of the paste was prepared in methylethylketone (MEK) and was utilized to prepare dip coated samples of metallic thin film magnetic recording media.

For each example, the recording medium comprised a biaxially oriented polyester film backing having a thickness of about 15 micrometers and an aluminum thin film coating on one face. Over that coating was vapor deposited a cobalt-nickel-titanium alloy to a thickness of about 1000 angstroms to provide a magnetizable coating.

Strips of this medium were dip coated with compositions of the invention by the process described by C. C. Yang et al, *Thin Solid Films,* Vol. 74, pp. 117–127, (1980). This method comprises withdrawing a tape, prepared as described above, from a container of dilute coating composition by means of a nylon thread attached to the shaft of a low speed synchronous motor. Samples coated in this manner were somewhat thicker near the edges than at the center.

After the dip coated media were allowed to dry, they were subjected to ultraviolet radiation in a vacuum using a BTC Ascor vacuum printer 1601-11 (Berkey Technical, Burbank, Calif.) using a 2 kw Addalux medium pressure mercury lamp no. 1406-02. Eight minutes was a typical exposure time. This polymerized the coatings to provide a low surface energy topcoat. During the photopolymerization, the system should remain oxygen free by maintaining a vacuum or an inert atmosphere. Photopolymerization initiators or sensitizers (e.g. benzophenone or benzoin) may be incorporated into the compositions of this invention. Other methods may also be used to polymerize the compositions of this invention, such as: electron beam curing, thermal curing, and gas curing (e.g. ammonia for isocyanate groups).

Coating thickness may be controlled by the proportion of solvent used to make the dilute solution. Coating thickness is typically less than 50 nanometers, and preferably less than 25 nanometers. Coating techniques include brushing, wire or knife coating, spraying, and gravure coating.

For the purpose of comparison, control samples were made for some of the examples. The controls were the same as the inventive samples except that they were coated in two steps: (1) applying a first coating of phosphorylated resin from a non-fluorinated organic solvent; drying; and (2) applying a second coating of perfluoropolyether in a fluorinated solvent, drying and then photocuring.

Several tests are used to judge the quality of the cured top coat. In the scratch resistance test, a piece of magnetic recording medium is mounted on a microscope slide, typically by means of adhesive tape. The slide is placed in contact with a sapphire bead about 1.5 millimeters in diameter which bead is affixed to the end of a tapered hollow tube which is filled with metal shot to a total weight of about 85 grams. The resulting pressure on the surface of the magnetic thin film recording medium has been calculated to be about 1,000 kg/cm$^2$ (9.8×10$^8$ dynes/cm$^2$). The slide is oscillated by means of a motor driven mechanism at a frequency of about 100 cycles per minute and a stroke length of about four centimeters. Failure of the recording medium is readily discerned as a visible scratch through the thin metal film, and time or number of cycles to failure is the parameter used to measure the endurance of the protective lubricant coating. This failure can be recorded by means of a digital counter which is actuated by a photocell detecting light shining through the scratch. Recording media without a top coat fail this test after one cycle of the oscillation.

Coefficient of friction, as measured by the Inclined Plane Standard method, ANSI BH1.47 1972 of the American National Standards Institute, is another test of the performance of the coating. Each scratch resistance test and coefficient of friction test value is an average of six much tests.

EXAMPLE IV

A blend of the perfluoropolyether diacrylate of Formula II (having an average molecular weight of about 2000) and Resin A was prepared as described above. Fifteen milligrams of the blend were mixed in ten ml. of MEK, and a sample of the previously described magnetic tape was dip coated in this solution to produce a protective top coat having a thickness less than about 20 nanometers. After photocuring of the sample, the following results were obtained: coefficient of friction ($\mu$) of 0.16 to 0.17, and scratch resistance test value of about 360 cycles. The control sample produced by the two step process had a scratch resistance value of about 308 cycles.

EXAMPLE V 15 milligrams of a blend of the same perfluoropolyether diacrylate used in Example IV and Resin B was mixed with 10 ml of MEK and used to prepare a tape sample having a protective top coat with a thickness of about 30 nanometers. The following results were obtained: $\mu$ of about 0.16, and scratch resistance value of about 287 cycles. The control had a scratch resistance value of about 262 cycles.

EXAMPLE VI

A blend similar to the previous two examples but using Resin C was prepared. 15 ml of the blend were mixed with 10 ml. of MEK or methyl isobutyl ketone (MIBK), and this mixture was used to prepare a lubricated magnetic tape as an in Example I, having a top coat thickness of less than about 25 nanometers. The following results were obtained: $\mu$ of about 0.18, and scratch resistance value of about 438 cycles, as compared to a scratch resistance value of about 408 cycles for the control.

The mixtures of perfluoropolyethers with the organic dyes of part b. have also been tested. In the examples which follow the general procedure for making the perfluoropolyether dye compositions was to first dissolve about one part by weight of perfluoropolyether in about 10 parts by weight of Freon 113 chlorofluorocarbon solvent. To this solution was added about 0.1 parts by weight of the dye in about 2 to 5 parts of tetrahydrofuran. The resulting mixture was agitated, and then the solvents were removed. The perfluoropolyether dye residue thus formed was soluble (stable) in common non-fluorinated solvents.

The coating solutions used were prepared by dissolving a phosphorylated resin (about 85 to 88 weight percent solids) as previously described and a perfluoropolyether dye complex (about 12 to 15 weight percent solids) in a non-fluorinated solvent such as MEK, MIBK or tetrahydrofuran to typically achieve a 0.15 weight/volume percent concentration.

EXAMPLE VII

A complex was made using the diacrylate compound of Formula II as the perfluoropolyether and Calco red ym dye (an azo dye available from American Cyanamid Company), in the above-described method. 1.8 mg of the perfluoropolyether/dye complex was dissolved in 10 ml of MEK to which was added 13.2 mg of Resin A. The resulting mixture was a stable species and was used to prepare magnetic tape samples as in the previous examples. The protective top coat had a thickness less than about 20 nanometers. The following test results were obtained: $\mu$ of 0.18 to 0.19, and scratch resistance value of about 343 cycles.

EXAMPLE VIII

A coating solution was prepared as in Example VII with the exception of utilizing Resin B and Oil Red (color index 26105) dye as components instead of resin A and Calco red dye. Test results are as follows: $\mu$ of about 0.17, and scratch resistance value of about 261 cycles.

EXAMPLE IX

A coating solution was prepared as in Example VII with the exception of utilizing resin C and N-(p-dimethylaminophenyl)1,4-naphthoquinoneimine (available from Eastman Kodak Company, as dye no. 478) as the dye. Test results are as follows: $\mu$ of about 0.18 to 0.19 and scratch resistance value of about 426 cycles.

Another suitable dye in the practice of this invention is 1-(o-tolylazo-4'-(o-toluidene))2-napthol, available as Solvent Red 24:1 from E. I. DuPont de Nemours Co.

EXAMPLE X

A blend similar to that of Example V was made except that the weight ratio of perfluopolyether diacrylate to Resin B was about 1.8/8.2, and the concentration of the mixture in MEK was about one weight percent. A control was made using non-phosphorylated methacryloyloxyhydroxypropylisophthalate instead of the phosphorylated resin. The control had a separate polyether phase planely visible on the bottom, while the inventive sample did not.

Instead of coating the inventive compositions onto substrates out of a solution as in the previous examples, they may be directly coated by means of vacuum vapor deposition. In one such procedure, the paste form of the composition is placed in an evaporation boat in a vacuum coating apparatus, and under vacuum coating conditions (e.g. a pressure of $10^{-6}$ torr), the composition evaporates and attaches to a substrate inside the chamber of the coating apparatus.

This technique has the advantage that no solvents are needed, and the top coat can be applied in line following the vapor deposition of a thin-metal film magnetic medium on a flexible (e.g. polyester) backing.

As mentioned earlier, there are other applications for these new compositions beside that of protective topcoats for magnetic recording media. One example would be in the printing industry. The coatings of this composition could be used as a one coat photopolymer to be coated on printing plates. Other potential uses relate to applications as components of: release agents, automotive finishes, and coatings for leather, floor materials, and fabrics.

Other embodiments of this invention will be apparent to those skilled in the art from a consideration of this specification or practice of the invention disclosed herein. Various omissions, modifications and changes to the principles described herein may be made by one skilled in the art without departing from the true scope and spirit of the invention which is indicated by the following claims.

What is claimed is:

1. A single phase composition useful as a coating for magnetic recording media comprising a mixture of:
   (a) a perfluoropolyether having the formula Q—R$_f$—$_k$C$_a$F$_{2a}$—Z wherein Q comprises a polymerizable group containing ethylenic unsaturation attached to R$_f$ which represents a chain of one or more randomly distributed perfluoroalkylene oxide units represented by —C$_a$F$_{2a}$O—, in which a is independently an integer of 1 to 4, k is the number of such repeating units having a value from 1 to 300 such that the segment R$_f$ has a number average molecular weight of about 500 to 20,000, and Z is selected from the group consisting of —OC$_a$F$_{2a+1}$ and Q;
   (b) a solubilizing agent which is:
      (i) not spontaneously chemically reactive with the perfluoropolyether of part (a);
      (ii) soluble to at least one weight percent in a common non-fluorinated organic solvent; and
      (iii) selected from the group consisting of:
   oil soluble azotic conjugated compounds selected from the group consisting of iminoquinone dyes, diiminoquinone dyes, azo dyes; phosphorylated compounds which are made by reaction between a compound having the formula

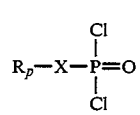

in which R$_p$ is an alkyl, cycloalkyl or aromatic group; and X is selected from the group consisting of —O—, —S—, and

in which R' is —H or —R$_p$,
with an organic compound selected from the group consisting of α,β-unsaturated carboxylic acid esters of polyhydric phenols, acrylates and methacrylates of glycidyl esters of dicarboxylic acids, and urethane acrylates and combinations thereof.

2. The single phase composition of claim 1 in which the perfluoropolyether of part a. and the phosphorylated compounds of part b. are polymerizable.

3. The composition of claim 2 wherein the perfluoropolyether of part a. has an average of at least about 1.5 polymerizable, ethylenically unsaturated sites per molecule, and the phosphorylated compounds of part b. have a plurality of ethylenically unsaturated polymerizable moieties.

4. The composition of claim 3 wherein Q of the formula comprises a moiety consisting of one monovalent moiety selected from the group consisting of

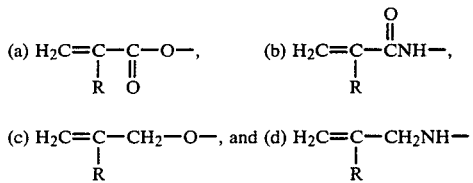

wherein R is hydrogen or methyl, and a divalent moiety selected from the group consisting of —$CH_2$—, —$CNH(CH_2)_2$ and combinations thereof.

5. The composition of claim 3 wherein the perfluoropolyether has the formula

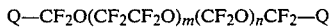

wherein m and n designate the number of randomly distributed perfluoroethyleneoxy and perfluoromethyleneoxy backbone repeating units respectively, n and m having independently values of from 1 to 200, the ratio m to n is between about 0.2/1 and about 5/1, and Q is selected from the group consisting of:

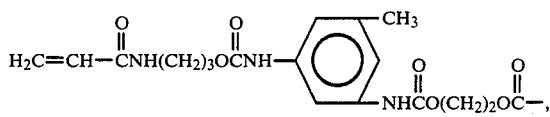

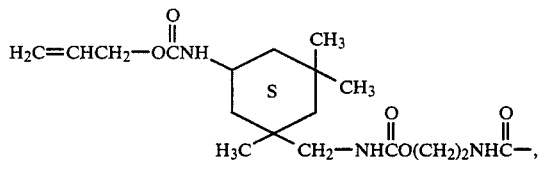

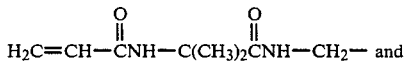

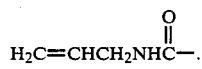

6. The composition of claim 1 which contains both a phosphorylated compound and an azotic conjugated compound as those compounds are described in claim 1.

7. The composition of claim 2 which further comprises an added non-fluorinated, common organic solvent.

8. The composition of claim 7 wherein the added solvent is selected from the group consisting of methylethyl ketone, methylisobutylketone, tetrahydrofuran, toluene, benzene, xylene, cyclohexanone and ethanol.

9. The method of preparing the composition of claim 7 which comprises the steps of:
(i) mixing (a) with (b) to form a paste or blend; and (ii) mixing the paste or blend of step (i) with the added solvent to form a solution.

10. The composition of claim 7 in which the perfluoropolyether comprises up to about one-third of the mixture of perfluoropolyether and solubilizing agent, and the concentration of said mixture in the solvent ranges between greater than 0 and about 25 weight percent.

11. The composition of claim 10 in which the solubilizing agent is a phosphorylated compound.

12. The composition of claim 1 in which the phosphorylated compound of part b. is selected from the group consisting of:
phosphorylated bis[4(methacryloyloxyhydroxypropylcarbamato)cyclohexyl]methane;
phosphorylated methacryloyloxyhydroxypropylisophthalate;
phosphorylated dimethacrylate of hydroxypropoxylated bisphenol A; and
phosphorylated copolymers of glycidyl methacrylate and a monomer selected from the group consisting of alkyl methacrylate, alkyl acrylate, and mixtures thereof.

13. The copolymer composition produced by: exposing the composition of claim 2 to electromagnetic radiation in an atmosphere substantially free of oxygen to copolymerize the perfluoropolyether and the phosphorylated compound.

14. The single phase composition of claim 1 which further comprises a common non-fluorinated organic solvent selected from the group consisting of aromatics; ketones; ethers; esters; amides; alcohols; chlorinated aliphatic and cycloaliphatic solvents and blends of the foregoing.

15. The single phase composition of claim 1 in which the oil soluble azotic conjugated compounds are selected from the group consisting of:
iminoquinone dyes of the following structures:

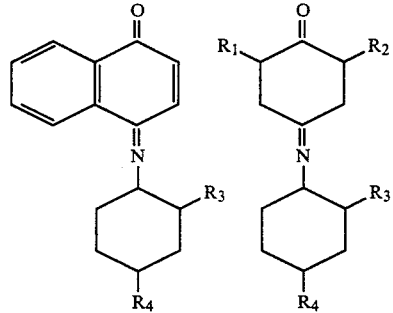

wherein $R_1$ and $R_2$ are —H, —Cl or —$CH_3$; $R_3$ is —H or methyl; and $R_4$ is a —H, dialkylamino or morpholino group; and an azo dye having the molecular structure

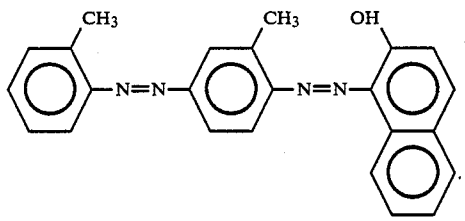

16. The composition of claim 3 wherein Q of the formula is selected from the group consisting of:

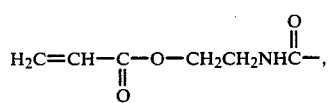
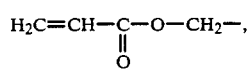
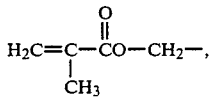
$H_2C=CH-CH_2-O-CH_2-$ and
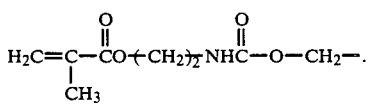
* * * * *

UNITED STATES PATENT AND TRADEMARK OFFICE
CERTIFICATE OF CORRECTION

PATENT NO. : 4,569,962  Page 1 of 2
DATED : February 11, 1986
INVENTOR(S) : Mario Burguette and George D. Foss It is certified that error appears in the above-identified patent and that said Letters Patent is hereby corrected as shown below:

In column 4, line 27, the formula $Q-R_f-{}_kC_aF_{2a}-Z$ should be $Q(R_f)_kC_aF_{2a}-Z$.

In column 16, lines 21 and 22, the formula $Q-R_f-{}_kC_aF_{2a}-Z$ should be $Q(R_f)_kC_aF_{2a}-Z$.

In column 18, lines 37 to 50, the formulas should be as follows:

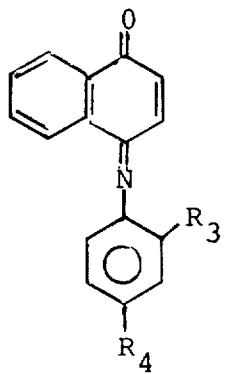 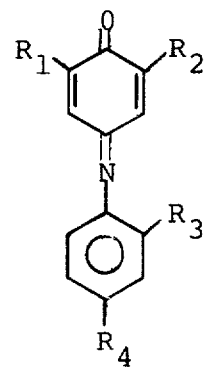

UNITED STATES PATENT AND TRADEMARK OFFICE
CERTIFICATE OF CORRECTION

PATENT NO. : 4,569,962

DATED : February 11, 1986

INVENTOR(S) : Burguette et al

Page 2 of 2

It is certified that error appears in the above-identified patent and that said Letters Patent is hereby corrected as shown below:

In column 10, line 53:
"Preparation of Resin A" was omitted

In column 14, line 23:
much should be --such--

Signed and Sealed this

Second Day of September 1986

[SEAL]

Attest:

Attesting Officer

DONALD J. QUIGG

Commissioner of Patents and Trademarks